United States Patent

[11] 3,614,254

| [72] | Inventor | Alfred E. Gabrys |
| | | Canoga Park, Calif. |
| [21] | Appl. No. | 872,567 |
| [22] | Filed | Oct. 30, 1969 |
| [45] | Patented | Oct. 19, 1971 |
| [73] | Assignee | CCI Aerospace Corporation |
| | | Van Nuys, Calif. |

[54] VARIABLE GEOMETRY, ROTARY VALVE, SPEED CONTROLLED TURBINE
7 Claims, 6 Drawing Figs.

[52] U.S. Cl. .................................................. 415/36,
60/39.18, 137/15.1
[51] Int. Cl. .................................................. F01b 25/06
[50] Field of Search .......................................... 415/36, 46;
137/15.1, 15.2; 60/39.18 C

[56] References Cited
UNITED STATES PATENTS

| 2,646,211 | 7/1953 | Isabella | 137/15.1 |
| 2,815,188 | 12/1957 | Nelson | 415/46 |
| 2,970,431 | 2/1961 | Harshman | 137/15.1 |
| 2,999,656 | 12/1961 | Ward | 137/15.1 |
| 3,175,355 | 3/1965 | Knauer | 137/15.1 |
| 3,514,957 | 6/1970 | Evans | 137/15.2 |

*Primary Examiner*—C. J. Husar
*Attorney*—Robert E. Geauque

ABSTRACT: Apparatus for controlling the induction of motivating air into a turbine wherein a governing mechanism effects rotation of the air inlet tubes which is capable of simultaneously reducing the inlet capture area and changing the direction of airflow from the inlet tubes into the turbine.

PATENTED OCT 19 1971　　3,614,254

ALFRED E. GABRYS
INVENTOR.

BY R.E. Geangue
ATTORNEY

ALFRED E. GABRYS
INVENTOR.

BY R. E. Grangue
ATTORNEY

VARIABLE GEOMETRY, ROTARY VALVE, SPEED CONTROLLED TURBINE

BACKGROUND OF THE INVENTION

The field of this invention applies to air induction speed control of ram air turbines and various other fluid power converting devices.

In powered and free-falling vehicles, internally housed ram air turbines are frequently employed to supply auxiliary power. It is desirable to have the rotational speed from the turbine maintained substantially constant as most auxiliary devices are to operate at a constant rotational speed. Because of the variable speed characteristics of the vehicles and therefore the air supplied to the turbine also varies in velocity, some means must be included within the turbine apparatus to cause the power output of the turbine to be substantially constant.

Heretofore, there have been many attempts at designing structures to make constant the power output of such turbines. Usually such structures operate in conjunction with some form of governing mechanism which is subjected to the rotational torque output of the turbine. Such structures have usually taken the form of either a valve to simply restrict the passage of air within the turbine or the forming of the turbine blades to vary the angle of incidence of the blades with respect to the direction of the inlet air. Both of these structures have high loads introduced into the governing mechanism and present the same inlet capture area throughout the entire range of vehicle speeds thereby inducing high-drag loads on the vehicle.

It would be desirable to design a structure for maintaining the rotational speed of a turbine substantially constant which did not introduce high loads into the governing mechanism and did not induce high-aerodynamic drag loads on the vehicle.

SUMMARY OF THE INVENTION

The apparatus of this invention pertains to structure to maintain substantially constant the rotational speed of a ram air turbine. The ram air turbine includes a fixed blade rotor which is rotatable upon being subjected to air under movement through the blades. The rotational torque created by the rotor is to supply the power input to some auxiliary device or devices within the vehicle. A governing device is connected to the rotor and rotatable therewith. The governing device effects operation of an actuator which through appropriate linkage causes lineal movement of a rack gear assembly. The rack gear assembly effects rotation of first and second pinion gears which are respectively integrally attached to first and second air inlet tubes. First and second air inlet tubes extend exteriorly of the skin surface of the vehicle and each are rotatably supported within separate sleeves. Each of the inlet tubes terminate in an elliptical opening which cooperates with similar openings within their respective sleeves. Air is permitted to pass through the elliptical openings of the sleeves into a passage and into contact with the turbine blades. Each of the air inlet tubes are rotatable so the elliptical openings of each tube and each sleeve can be in full alignment or in partial alignment or not in alignment. In the nonalignment position the elliptical opening of each tube cooperates with a second diamond-shaped opening within each sleeve. The diamond shaped openings permit passage of air from the tubes to within the sleeves and subsequently through their respective elliptical openings. Each of the inlet tubes terminate in an airscoop exteriorly of the vehicle which is to be in the position of greatest air intake with the elliptical openings in alignment. With the elliptical openings of each inlet tube cooperating with their respective diamond shaped opening, the scoops are located in the minimum air intake position.

One of the objects of this invention not readily apparent from the above is since the air inlet tubes are mounted on bearings, the airloads normally transmitted to the governing mechanism of the previous apparatuses are taken directly by the bearings and not transmitted to the governing mechanism.

Another such object of this invention is through the use of two inlet tubes, each being rotatable in the opposite direction from each other, the entire apparatus maintains symmetry thereby negating any undersired rotational effects due to the airscoops of each tube.

DETAILED DESCRIPTION OF THE SHOWN EMBODIMENT

Figure 1:
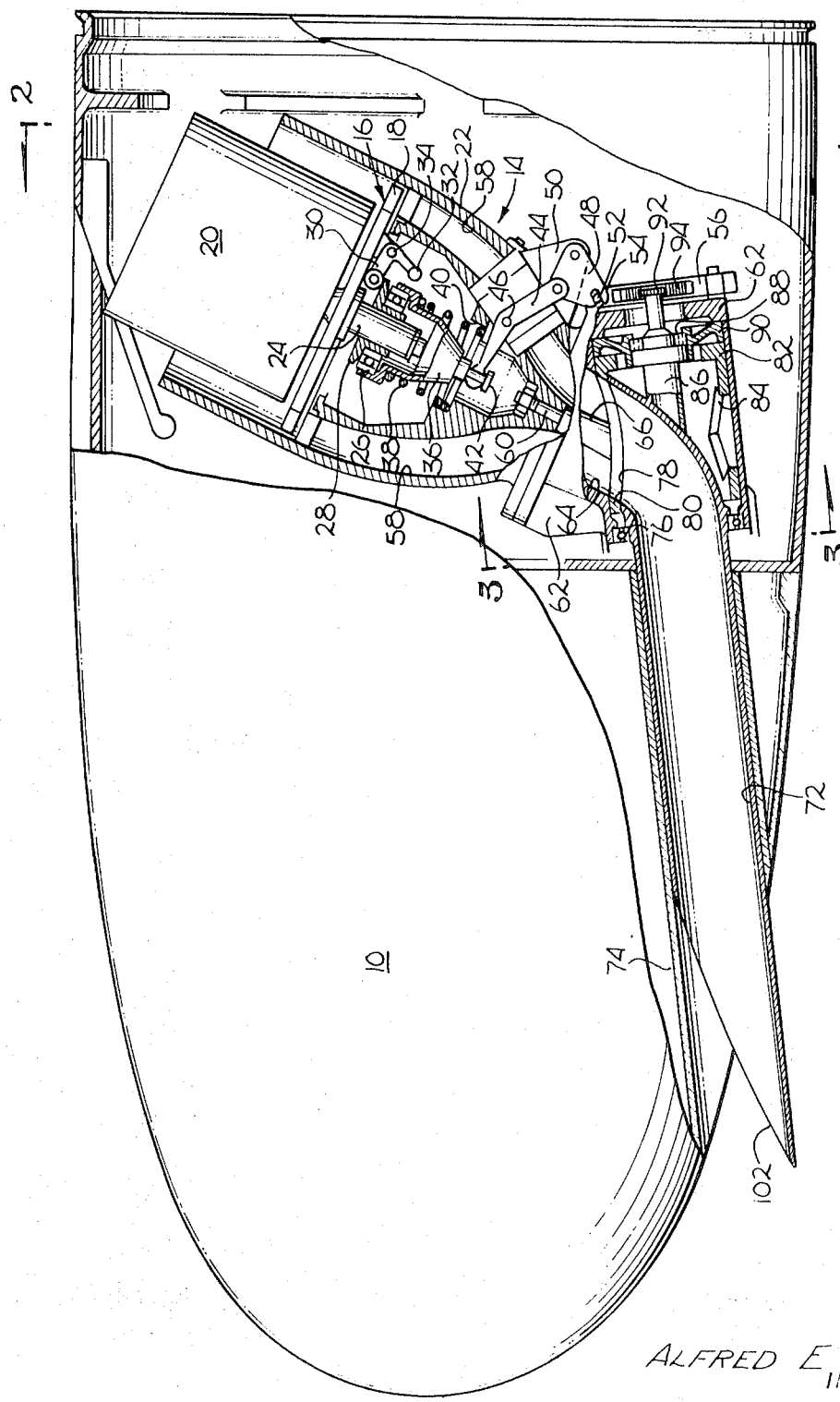
FIG. 1 is a cutaway partly in section view showing the apparatus of this invention employed in conjunction with a ram air turbine of the nose portion of an aerodynamic vehicle.
Figure 2:
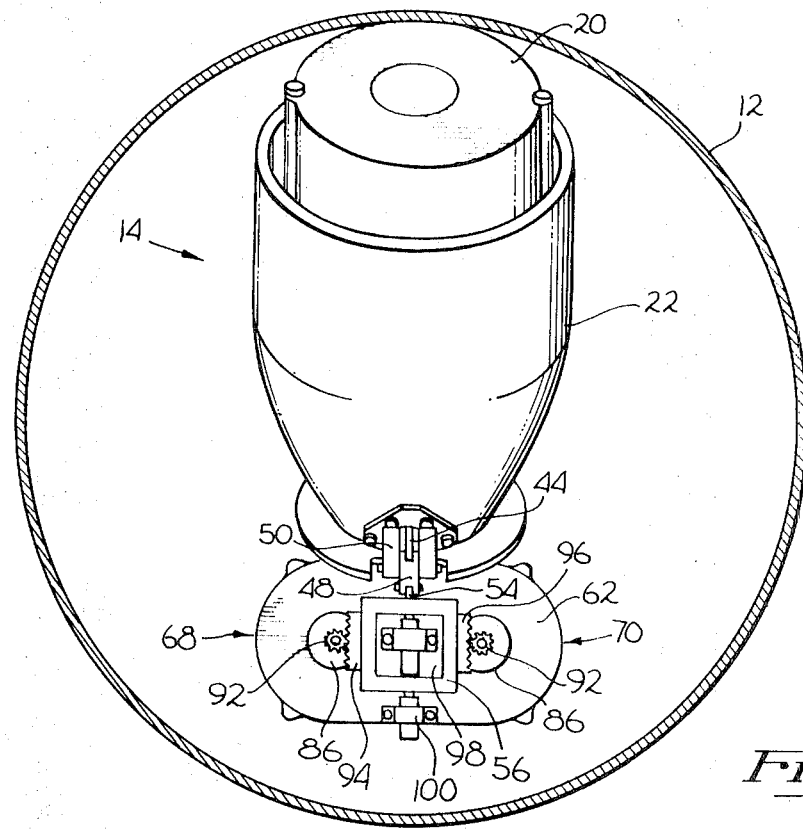
FIG. 2 is a partly in section view taken along line 2—2 of FIG. 1.
Figure 3:
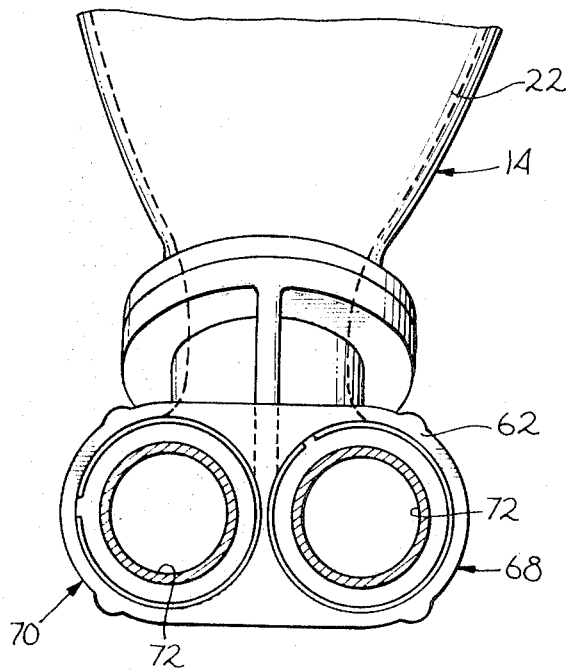
FIG. 3 is a partly in section view taken along line 3—3 of FIG. 1.
Figure 4:
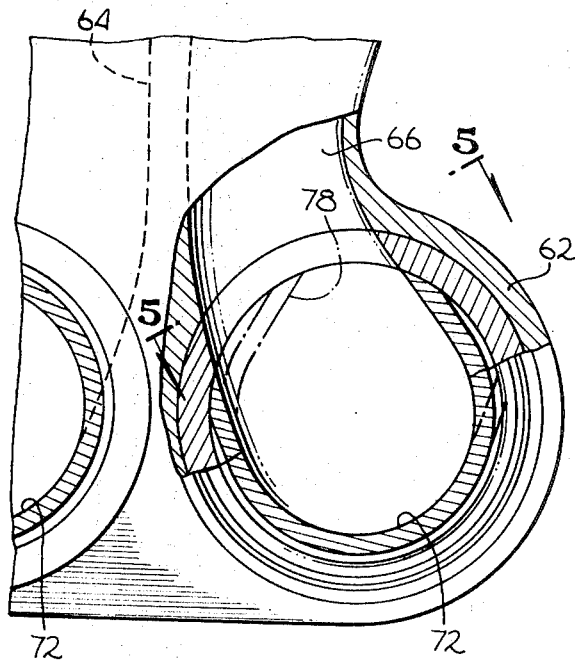
FIG. 4 is a cutaway, partly in section view through one of the inlet tubes employed in this invention showing in more detail the elliptical openings of the tube and the sleeve.
Figure 5:
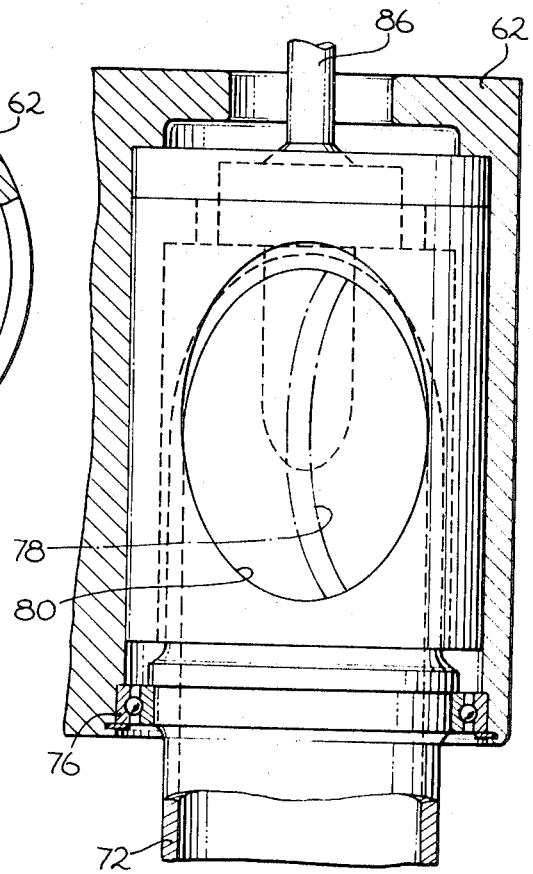
FIG. 5 is a partly in section view taken along line 5—5 of FIG. 4.
Figure 6:
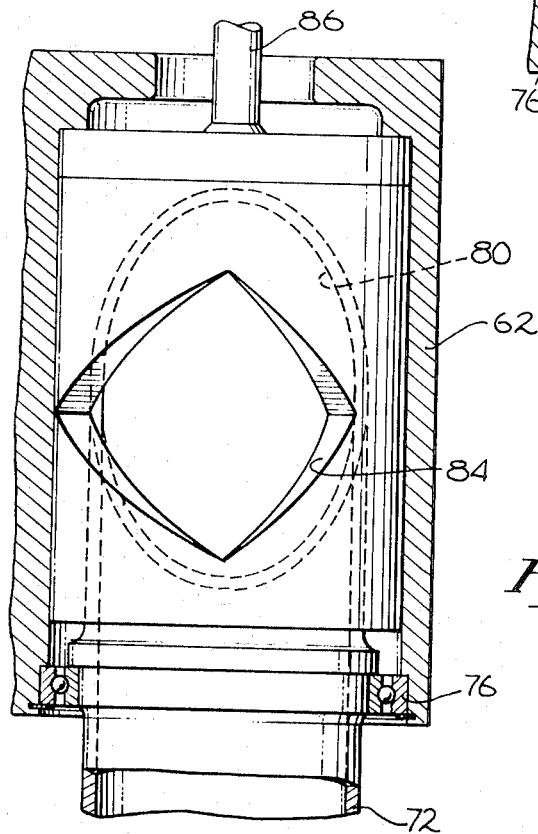
FIG. 6 is a partly in section view showing in more detail the diamond shaped opening within one of the sleeves.

Referring particularly to the drawings there is shown in FIG. 1 the nose section 10 of an aerodynamic vehicle 12 (such as a missile) within which is mounted a ram air turbine assembly 14. Assembly 14 includes a turbine rotor 16 which comprises a plurality of turbine blades 18 which are capable upon being contacted by an airstream to cause rotation of the rotor 16. The rotational torque of the rotor 16 is to be transmitted to alternator 20 which in turn produces electrical power to operate one or more auxiliary devices (not shown) within the vehicle 12.

The rotor 16 is rotatably supported within the housing of the alternator 20 through a shaft 24. An actuator sleeve 28 is positioned about shaft 24 between a bearing assembly 26 with the sleeve 28 being capable of sliding movement with respect to shaft 24. An actuator lever 30 of the flyweight 32 acts against the upper end of sleeve 28 with the flyweight 32 being pivotally supportingly attached by trunnion 34 to rotor 16. Bearing assembly 26 is held within a guide 36 which also functions to retain one end of a compression spring 38. The other end of spring 38 rests within a recess 40 formed in turbine housing 22. Guide 36 terminates in a follower 42 which is to cooperate with linkage arm 44 which is fulcrumed 46 at approximately its midpoint to turbine housing 22. Linkage arm 44 is pivotally attached to an actuator plate 48 which is also pivotally secured to fixed plate 50 which is fixedly secured to turbine housing 22. Plate 48 includes a recess 52 which is to cooperate with pin 54 of the rack gear frame 56.

Internally of turbine housing 22 adjacent its outer surface is annular passage 58 which is capable of conducting air to contact the turbine blades 18. Fixedly secured to housing 22 by bolt 60 is a tube housing 62 which has passageways 64 and 66 which cooperate with passage 58. Tube housing 62 is to permit access of first and second tube assemblies 68 and 70 and conduct forced air from each of the assemblies 68 and 70 into passage 58. The tube assemblies 68 and 70 are identical in design so like numerals will be employed to designate like parts.

Each tube assembly 68 and 70 includes a rotatable inner tube 72 supported within an inlet tube 74. Tube 74 is formed integrally with nose section 10 and opens exteriorly of the outer surface of nose section 10. It is also important to note that the tube 74 opens to capture only a small portion of the airstream about the nose section 10. Each inner tube 72 is rotatably supported by a bearing 76 within the tube housing 62. Each inner tube 72 terminates interiorly in an elliptical shaped opening 78 which cooperates with a similar opening 80 of a sleeve 82 supported within the tube housing 62. It is to be understood that two such sleeves 82 are employed, one for each tube assembly 68 and 70. Each sleeve 82 has a second opening 84 which is substantially diamond shaped in design and spaced a predetermined distance from the elliptical opening 80.

Attached to each inner tube 72 is a shaft 86 which is rotatably supported by bearings 88 retained by bearing housing 90 which is supported by tube housing 62. Each shaft 86 terminates in a pinion gear 92 which contacts first and second rack gears 94 and 96. Rack gears 94 and 96 are attached to rack gear frame 56 with frame 56 being longitudinally movable within guides 98 and 100 which are attached to tube housing 62.

The operation of the speed control mechanism of this invention is as follows: It will be assumed the vehicle is traveling at a low airspeed and therefore the mechanism is positioned as shown in FIG. 1 to obtain maximum air induction into the system. Each of the inner tubes 72 includes an outer airscoop 102 which when in the position shown in FIG. 1, is in the greatest air inlet capture position. Air is conducted from exteriorly of the nose section 10 through the inner tubes 72 through elliptical opening 80 of sleeves 82 into passage 58 subsequently driving turbine blades 18. Upon increase of the airspeed of the vehicle 12 a greater volume of air flows through tubes 72 thereby driving turbine rotor 16 at a greater velocity. As it is necessary to maintain the rotor velocity substantially constant, thereby maintaining the speed output constant, it is desirous to decrease the volume of air intake. For this purpose the apparatus of this invention is employed.

As the rotor 16 speed increases, the fly weight 22 is moved radially outwardly due to centrifugal force. As a result actuator lever 30 reacts against sleeve 28 and compresses spring 38. Linkage arm 44 is pivoted thereby pivoting actuator plate 48 which results in frame 56 moving upwardly toward the turbine housing 22. Each of the pinion gears 92 are rotated (in opposite directions with respect to each other) due to the lineal movement of rack gears 94 and 96. Thereupon, one inner tube 72 is rotated clockwise and the other inner tube 72 is rotated counterclockwise. As a result a smaller volume of air flows into passage 58 for two reasons; (1) the rotation of the airscoops 102 causes the air inlet capture area to decrease, and (2) the elliptical opening 78 of each inner tube 72 is moved out of total alignment with opening 80 of their respective sleeves 82.

If the turbine rotor 16 is still rotating at too great a velocity, each of the tubes 72 can be rotated so the airscoops 102 align with the inner wall of tubes 74 thereby negating the effect of each airscoop 102 and exposing each tube 72 to the minimum air inlet capture area. In this minimum air inlet position each of the elliptical openings 78 are aligned with their respective diamond shaped opening 84. As a result of the confinement of the air, the air is required to reverse direction after exit from the tubes 72 and be conducted up around the exterior of each tube 72 prior to entering passage 58 through elliptical opening 80 of sleeve 82. Clearly this changing of air direction causes a loss in velocity of the air thereby tending to lower the speed of the turbine rotor 16.

What is claimed as new in support of Letters Patent is:

1. A speed control apparatus to decrease the volume of air intake to a ram air turbine, said turbine having a rotatable rotor formed of a plurality of turbine blades, said apparatus comprising:
a governor mechanism being connected with said rotor, said governor mechanism effecting rotation of at least one air inlet tube, said air inlet tube having an air inlet opening and an air exit opening, said air exit opening cooperating with an air passage of said turbine and being capable of conducting air from said exit opening into said passage, upon rotation of said air inlet tube said air exit opening of said tube being movable out of direct alignment with said passage.

2. An apparatus as defined in claim 1 wherein:
said air inlet opening of said air inlet tube comprises a scoop being capable of increasing the air inlet capture area of said tube.

3. An apparatus as defined in Claim 2 wherein:
There being two in number of said air inlet tubes. The rotation of one of said air inlet tubes being in the opposite direction than the other of said air inlet tubes.

4. A speed control apparatus to decrease the volume of air intake to a ram air turbine, said turbine having a rotatable rotor formed of a plurality of turbine blades, said apparatus comprising:
a governor mechanism being connected with said rotor, said governor mechanism effecting rotation of at least one air inlet tube, said air inlet tube having an air inlet opening and an air exit opening, said air exit opening cooperating with an air passage of said turbine and being capable of conducting air from said exit opening into said passage, upon rotation of said air inlet tube said air exit opening of said tube being movable out of direct alignment with said passage; and
a sleeve being located intermediate said air exit opening of said tube and said passage, said sleeve having a first opening similar size to said air exit opening of said tube, said sleeve having a second opening being spaced from said first opening, upon rotation of said tube said air exit opening being capable of being nonassociated with said first opening and associated with said second opening.

5 An apparatus as defined in Claim 4 wherein:
said second opening being of a substantially diamond shape.

6. A n apparatus as defined in Claim 3 wherein:
each of said air inlet scoops being rotatable in a synchronized manner between a maximum air inlet capture position and a minimum air inlet capture position;
a sleeve being located intermediate said air exit opening of each of said tubes and said passage, each of said sleeves having a first opening similar in size to said air exit opening of each of said tubes, each of said sleeves having a second opening being spaced from said first opening, with said air inlet scoops being located in said maximum air inlet capture position said air inlet exit opening of each tube being in direct alignment with said first opening of its respective sleeve, with said air inlet scoops being located in said minimum air inlet capture position said air inlet exit opening of each tube being in direct alignment with said second opening of its respective sleeve.

7. An apparatus as defined in Claim 6 wherein:
said governor mechanism operates a linkage assembly, said linkage assembly operates a gearing assembly to effect rotation of said tubes, said gearing assembly includes a rack gear capable of effecting simultaneous rotation of first and second pinion gears, said first pinion gear causing rotation of one of said inlet tubes, said second pinion gear causing rotation of the other of said inlet tubes.